UNITED STATES PATENT OFFICE.

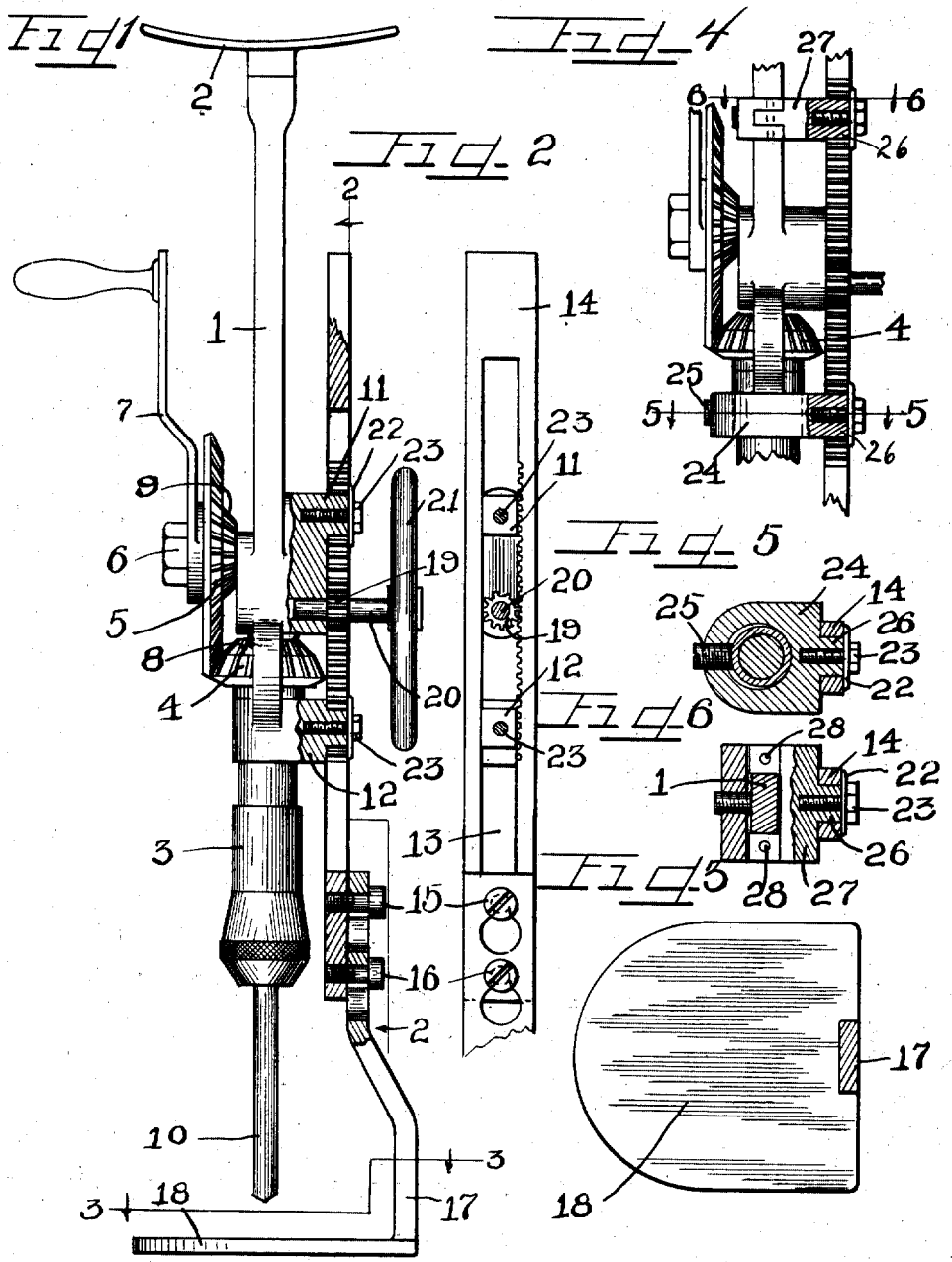

ALPHEUS FOX, OF CHICAGO, ILLINOIS.

BREAST-DRILL.

994,450.

Specification of Letters Patent.

Patented June 6, 1911.

Application filed December 16, 1909. Serial No. 533,497.

*To all whom it may concern:*

Be it known that I, ALPHEUS FOX, a citizen of the United States, and a resident of the city of Chicago, in the county of Cook and State of Illinois, have invented certain new and useful Improvements in Breast-Drills; and I do hereby declare that the following is a full, clear, and exact description of the same, reference being had to the accompanying drawings, and to the numbers of reference marked thereon, which form a part of this specification.

My invention relates to breast drills, and has for its object to provide an improved mechanism therefor for feeding the drill to and from the work, said mechanism operating in conjunction with an adjustable work table for supporting the material to be operated upon. This object I accomplish in the manner and by the means hereinafter described and claimed, reference being had to the accompanying drawing, in which:—

Figure 1 is a view in side elevation partly in section. Fig. 2 is a fragmentary section on line 2—2 of Fig. 1, with parts omitted. Fig. 3 is a section on line 3—3 of Fig. 1. Fig. 4 is a fragmentary detail illustrating a construction whereby the feeding device embodied in my invention may be attached to any breast drill. Fig. 5 is a section on line 5—5 of Fig. 4. Fig. 6 is a section on line 6—6 of Fig. 4, with parts omitted.

As shown in the drawings: 1, indicates the shank of a breast drill of the usual or any suitable construction. 2, indicates the breast piece secured thereon, and 3, the rotatable chuck, the rotatable head of which is provided with a bevel pinion 4, as shown in Fig. 1, and meshing therewith is a bevel gear 5, adjustably secured on the shank 1, by means of a bolt 6, extending therethrough and adjustably engaging the shank in any suitable manner as, for instance, by engaging in either of two bolt receiving holes in said shank disposed in vertical alinement with each other. Said bolt also secures upon said bevel gear wheel a crank 7, whereby said gear wheel and thereby the pinion and chuck may be rotated.

As shown, complemental pinions 8 and 9, are provided, the one integral with the pinion 4, and the other integral with the gear 5, and which are adapted to mesh together to afford a slower drive when it is desired. To afford this adjustment the screw bolt 6, is removed from the upper of the two bolt receiving holes in the shank 1, and the pinions 8 and 9 meshed, in which adjustment said screw bolt 6 will be in position to enter the lower of the bolt receiving holes in said shank 1. A drill bit 10, of any kind is secured in the chuck for use in its characteristic manner.

On the rear side of the shank or that side opposite from the bevel gear 5 and bevel pinion 9, are bosses 11 and 12, as shown rectangular in cross section and adapted to fit in a longitudinal slot 13, in the rack bar 14. Said bar is of a length to extend downwardly to near or below the lower end of the chuck, and as shown, is provided on its outer side near its lower end with upper and lower set screws 15 and 16, which are adapted to project through slotted holes in the shank 17, integral with the table 18, which projects horizontally beneath the point of the drill. Said longitudinal slot in the rack bar 14, is provided with rack teeth on one side thereof adapted to mesh with a pinion 19, which fits into the slot in said rack bar and is rigidly secured on a shaft 20, journaled in the shank 1, and which is provided with a hand wheel 21, so that the drill may be elevated from or forced downwardly toward the table 18, positioned beneath the same. Said rack bar is slidably engaged on the studs or projections 11 and 12, in any suitable manner. As shown, a relatively large washer 22, is applied on each of said projections and overlaps the rack bar and a set screw 23, extends therethrough and engages the same firmly in place yet permits the rack bar free movement when actuated by its pinion, either in drawing the drill downwardly to the table or in elevating the drill therefrom.

It frequently happens that breast drills are not so constructed as to afford a sufficient body of metal centrally of the shank and above the chuck to permit of easy adjustment of the feed device embodying my invention. In applying the device to such a breast drill, the rack bar and table only are used, as shown in Figs. 4 to 6 inclusive. Connection with such a breast drill is readily accomplished by providing a clamping band 24, which engages the upper end of the chuck beneath the bevel gears, and as shown, a set screw 25, is provided in said clamp to bear against said chuck to hold the clamp firmly in place. A rectangular stud or projection 26, similar to the stud 11, or 12, before described, is provided on said clamp and adapted to project into the rack bar 14, as before described, and is likewise provided with a washer 22 and cap screw 23, which engage outside the rack bar and hold the same firmly in place although permitting vertical adjustment. In a similar manner a clamp 27, engages the upper part of the shank 1, of the breast drill, as shown in Figs. 4 and 6, said clamp being made in two parts and conveniently articulated together by means of pins 28, and also provided with a rectangular stud 26, washer 22 and cap screw 23, to hold the rack bar in operative relation.

The operation is as follows: Should it be desired to use the breast drill for boring in wood or in any situation where the feed and centering device may not be required, the same can be immediately removed from the device by simply removing the cap screws holding the rack bar in place. This permits the same together with the shaft 20, and pinion 19, to be removed intact to be again returned to place whenever required, or, should it not be desired to disassemble the structure, the table or foot-piece only may be removed by loosening the screws 15 and 16, and sliding the shank 17, on the lower end of the rack bar sufficiently to permit disengagement therefrom. The same is true also of the construction shown in Figs. 4 to 6 inclusive which clearly indicates that the special feed mechanism embodying my invention may be quickly detached or applied, if desired, to breast drills of any construction. When using the device as a feed mechanism it is only necessary to place the device to be drilled upon the table or foot piece 18, which is sufficiently broad to support the drill in an upright position. If the drill then is operated any desired degree of pressure may be secured upon the material operated upon by rotating the hand wheel 21, slowly, thereby rotating the pinion in the slot of the rack bar and thus moving the rack bar and supporting table and the drill toward or from each other. When it is desired to retract the drill it may be very quickly accomplished by means of the said hand wheel, pinion and rack. Practically any desired pressure may be secured upon the work and the pressure may be very readily graduated by means of the hand wheel and pinion. Inasmuch as the foot-piece is of sufficient size to ordinarily support the device in an upright position, it follows that the device serves every purpose of a bench or post drill. Furthermore, owing to the construction, should it be necessary to operate the tool in positions occupying slight space, the table or foot-piece 18, may be hooked beneath or on one side of the piece to be drilled, as, for instance, a part of a machine frame of any kind, and the drill steadied in position by holding the same with one hand applied to the hand wheel 21, while the crank is operated to rotate the chuck.

Of course, owing to the jointed connection between the rack bar and foot-piece, several different foot-pieces may be employed, some of which may be a mere hook to engage beneath the device to be drilled should the space therebeneath be exceedingly small.

Of course, numerous details of the construction may be varied. I therefore do not purpose limiting myself otherwise than necessitated by the appended claim.

I claim as my invention:

A device of the class described, embodying a breast drill, a longitudinally slotted internally racked bar slidably engaged on said drill and parallel with the axis thereof, said drill being supported and guided in the slot in said bar, a pinion rotatably engaged on the shank of the drill and in mesh with said rack in the slot in said bar, means for rotating said pinion, and a table connected with the lower end of said rack bar and projecting beneath the drill.

In testimony whereof I have hereunto subscribed my name in the presence of two subscribing witnesses.

ALPHEUS FOX.

Witnesses:
LAWRENCE REIBSTEIN,
K. E. HANNAH.

---

Copies of this patent may be obtained for five cents each, by addressing the "Commissioner of Patents, Washington, D. C."